United States Patent Office 3,006,765
Patented Oct. 31, 1961

3,006,765
CONTINUOUS BREAD MAKING PROCESSES WITH PROTEIN ADDITIVE
Charles G. Ferrari, Evanston, Ill., assignor to J. R. Short Milling Company, Chicago, Ill., a corporation of Illinois
No Drawing. Filed Jan. 20, 1959, Ser. No. 787,794
7 Claims. (Cl. 99—90)

This invention relates to the manufacture of bread and more particularly to improvements in methods for making bread continuously.

Until recently, bread was manufactured commercially by what is known in the chemical arts as a "batch" method. That is, given quantities of dough-forming ingredients were mixed to form a dough sufficient to produce a certain number of loaves, and such dough was moved progressively through the conventional steps in the bakery. With the advent of bakeries of unusually large size, a distinct need has been recognized for a continuous breadmaking process of such nature that the necessary ingredients can be fed continuously into a substantially automatic apparatus capable of providing finished loaves of bread continuously.

One such continuous process has been developed and is now in commercial operation. For successful continuous operation, that process depends largely upon two special steps. First, before the flour is incorporated, a brew is prepared by mixing water, yeast, yeast food and sugar, the brew being allowed to ferment for flavor production, rather than yeast propagation. Second, after a preliminary mixing of this brew and other dough-forming ingredients, including the flour, the dough mixture is subjected to a very high speed mixing step capable of developing a complete dough in a relatively short time, on the order of a few minutes or less. Frequently the total time for preliminary mixing and dough developing is about 3 minutes.

Such a continuous method has obvious commercial advantages, perhaps the most important of which is the fact that substantially all of the steps of the method are automatic, so that labor is minimized. Unfortunately, that process also has a distinct disadvantage in that the bread so produced is, by many standards, markedly inferior to that produced by the more conventional bakery methods. In particular, the bread produced by the continuous process as heretofore contemplated has a weak internal structure almost completely lacking in tenacity and elasticity. A slice of bread from such process can be characterized as "flimsy," having so little tenacity that a relatively slight stretching, or even a relatively gentle bending, of the slice will cause the same to tear and crumble, making it very difficult to butter.

While all of the reasons for these undesirable characteristics of the product are not definitely known, the primary cause appears to be the effect of the high speed dough mixing or dough developing step on which the process depends. Such a severe mechanical working of the dough disrupts the gluten structure to such an extent that the dough thereafter lacks the liveliness or resiliency required for good bread and, while the gluten phase of the dough is later reconstituted to some extent, it apparently never fully regains its original characteristics.

An object of the present invention is to improve such continuous bread making processes in a manner such that the bread so produced will have approximately the characteristics of bread produced by the more conventional bakery methods.

Another object is to overcome, in such a continuous process, the adverse effects of the high speed mixing or dough developing step on the gluten structure of the dough.

A further object of the invention is to devise a novel method for continuously producing bread rich in protein.

In general, these and other objects of the invention are achieved by a modification of the aforementioned continuous bread making process, such modification comprising the introduction, prior to the high speed mixing step, of an organoleptically bland, particulate, vegetable protein material the protein of which is predominantly of the globulin type, at least 40% thereof having a molecular weight on the order of or greater than 150,000 and a major proportion thereof having a molecular weight on the order of or greater than 300,000. While the invention is not predicated upon any particular theory of operation, it is believed that the novel high molecular weight protein additives of the invention are capable of better surviving the severe mechanical working to which the ingredients are subjected during the high speed dough mixing or developing step and, by their presence, serve either to effectively prevent, or to compensate for, the tearing down of the gluten structure which has heretofore occurred in the dough developing step.

In accordance with the invention, advantages also accrue if the protein material consists essentially of protein, has a reactively available –SH content of from zero to not more than $7 \times 10^{-6}$ moles per gram, and has a particle size of such fineness that substantially all of the material will pass a 100-mesh screen. Especially good results are obtained when the particle size is such that at least 80% of the material passes a 200-mesh screen.

A preferred and highly advantageous protein material for use in accordance with the invention is an isolated soybean protein material consisting essentially of substantially undenatured protein of the globulin type, having a reactivity available –SH content of $0–4 \times 10^{-6}$ moles per gram, only 20–30% of the protein having a molecular weight less than about 150,000, 40–50% thereof having a molecular weight on the order of or greater than 300,000 and 10–20% thereof having a molecular weight on the order of or greater than 600,000.

In order that the invention can be readily understood in full detail, the continuous process to which it applies will first be more completely explained. As has been mentioned, that process depends first on the making of a brew wherein fermentation is effected to develop flavor. This is accomplished by combining, in a suitable vessel with provisions for heating and stirring, water, yeast, sugar, yeast food. The brew is maintained at about 85° F. for three or four hours, with continual stirring, to accomplish fermentation.

The dry ingredients, usually consisting of flour and salt, are delivered from their respective storage vessels to the pre-mixing zone via proportioning feeders. The shortening, an oxidizing agent in solution (usually potassium bromate or iodate), and usually some additional water, are also delivered to the premixing zone continuously in proper proportions. Having been fermented, the brew is run first through a cooler and is then metered into the pre-mixing zone. Such zone may be provided in the form of a continuous screw conveyor, for example, capable not only of advancing the ingredients but also of providing a mixing action which, while not sufficient to develop a complete dough, is adequate to uniformly blend the ingredients.

The preliminary ingredient mixture so formed is delivered continuously to a heavy mixing device operated at such high speed as to complete the dough in the space of a few minutes or less. The total retention time from the input end of the screw conveyor to the output of the heavy mixing device is advantageously about 3 minutes. The severe mixing treatment carried out at this stage of the process converts the preliminary mixture to a soft, putty-like dough.

This dough is then extruded, as a continuous length of dough, from one or more nozzles associated with the high speed mixer, and dough pieces of the desired weight are cut successively from the extruded length of dough, these pieces falling directly into baking pans carried by a conveyor. The panned dough is proofed in a continuous proofer at about 98° F., and then baked in a continuous oven. In actual operation, the process is carried out at such high rates that 60–80 one-pound loaves are panned per minute.

In accordance with the invention, the special protein material employed is introduced with the dry ingredients into the pre-mixing zone. Thus, for example, the protein material can be advantageously combined with the flour as the flour is metered into the pre-mixing zone, or can be metered directly into that zone.

When it is desired only to improve the visual, organoleptic and physical characteristics of the product, the protein is added in relatively small proportions, but always in an amount equal to at least 0.5%, and advantageously at least 1.0%, of the weight of the flour.

On the other hand, if it is desired to produce a product containing a relatively large proportion of protein, the special protein material is added to the pre-mixing zone in relatively large amounts, up to 20% of the weight of flour employed.

Whether the protein material is added in a smaller proportion, in order to overcome the disadvantages of the continuous process, or in a higher proportion, in order not only to overcome such disadvantages but also to obtain a truly high protein bread, the protein is added as a dry, finely particulate material, at least as fine as 60-mesh and advantageously of the fineness hereinbefore described. Such a material can be metered easily, by a conventional proportioning feeder, into the premixing zone or into the stream of flour being fed to the premixing zone.

The following example is illustrative of a preferred method for producing protein material useful in accordance with the invention:

*Example 1*

Soybeans are first cleaned, cracked, hulled and classified, the clean fragments then being tempered at a jacket temperature of 78° C. for 8 minutes to reduce the moisture content by 8–12%, avoiding product temperatures over 60° C. The soybean material is then flaked and dried at 45° C. until the moisture content is about 45° C.

Using counter-current extraction equipment, the soybean material is then extracted with a solvent consisting of 20% hexane and 80% 188-proof ethanol. A solvent/flake ratio of 6:1 is employed, with a retention time in the extractor of 30–35 minutes at 55° C. The resulting oil-free, ethanol-contacted soybean material is recovered by centrifuging.

The soybean material so obtained is then extracted with water, employing a water/meal ratio of 16:1 at 28–30° C., the pH of the extract being adjusted to about 7.2 by means of sodium hydroxide. Extraction is carried out for one hour. The resulting suspension is run over shaker screens with the addition of 75–100% fresh water as a spray at tap temperature, the extract then being polished in a centrifuge.

With the extract at 25° C., the pH is then adjusted to 5.1 by addition of 8:1 acetic acid, resulting in precipitation of the protein to be recovered. The precipitate is concentrated by centrifuging, yielding a rubber-like curd containing 48–50% solids. The curd is then mechanically freed of some of its water, subdivided into relatively small pieces, and dried at a temperature not exceeding about 55° C. The dried protein material is ground to such fineness that 98–100% passes a 100-mesh screen and 80–90% passes a 200-mesh screen.

The protein product so obtained is a light tan, organoleptically bland material consisting essentially of soybean protein of the globulin type. Protein analyses run 100–102% (N×6.25). Electrophoretic and ultracentrifuge analyses show that only 20–30% of the protein has a molecular weight less than 150,000, at least 40% has a molecular weight on the order of or greater than 300,000 and 10–20% has a molecular weight on the order of or greater than 600,000. Amperometric titration with $Ag^+$ shows that the freshly prepared material contains no reactively available sulfhydryl groups. Such protein is substantially completely dispersible in water at a pH in the range of 7–8, without requiring additional heat. The protein is substantially completely undenatured, containing a relatively high proportion of active urease.

It will be noted from the foregoing examples that unduly high pH values and product temperatures above 55–60° C. are avoided. If these limitations are not followed, the protein is denatured in such manner that the final product will not have the desired molecular weight distribution and low reactively available –SH content.

While conditions affecting the molecular weight distribution of isolated proteins are not fully understood, it appears that the pH values (during extraction and precipitation) and the temperatures at various stages during isolation of the protein, are factors of primary importance. At least some of the protein fractions in the globulin of the soybean are capable of reversible polymerization, and it appears that the mild drying conditions hereinbefore specified promote such polymerization to yield relatively high proportions of the fractions with molecular weights on the order of 300,000 and 600,000. However, for such fractions to occur in the product in the desired relatively high proportions, it appears necessary to avoid denaturing prior to recovery of the protein, and also to carefully control the extraction and precipitation conditions in such manner that the protein in the curd to be dried will have a favorable molecular weight distribution.

It will also be noted that, before extraction of the protein, the soybean material is uniformly contacted with ethanol. This contacting step assures that the final protein product will be organoleptically bland, being completely free of the "beany" flavor and aroma usually encountered in soybean protein products. Instead of ethanol, any lower alkanol can be employed. Instead of employing the lower alkanol as a component of the oil extraction solvent, the soybean material can be first extracted with hexane and then contacted with the lower alkanol as a separate step, in which case temperatures in excess of 55° C. are avoided in both the oil-extraction and the alkanol contacting steps.

The following examples are illustrative of the invention:

*Example 2*

The method was carried out in a commercial scale continuous bread making plant characterized by employing a brew stage, a pre-mixing stage and a mixing stage wherein the preliminary dough was mixed at such high speeds as to develop a complete dough in a few minutes. The brew was prepared by combining yeast, yeast food, water and sugar in a heated mixing vessel, and stirring the mixture for 3 hours at 85° F. The fermented brew was run continuously through a heat exchanger to a pre-mixer in the nature of an elongated screw conveyor. The remaining ingredients, flour, salt, additional water, shortening, and an oxidative maturing composition comprising an aqueous solution of potassium bromate and potassium iodate, were metered into the pre-mixer.

The protein additive employed in this example was an isolated soybean protein prepared in accordance with Example 1 and consisting essentially of protein, the protein analyses being approximately 102 (N×6.25), approximately 48% thereof having a molecular weight on the order of or greater than 300,000, about 15% thereof having a molecular weight on the order of or greater tan 600,000, only about 20% having a molecular weight less than 150,000. Predominantly globulin in nature, the protein contained substantially no reactively available –SH. Substantially completely free of non-protein soybean components, the material was fully dispersible in water, without heating, at pH 7-8. The material was employed in finely particulate form, 99.5% thereof passing a 100-mesh screen, and over 80% thereof passing a 200-mesh screen. The particulate material was light tan in color and was organoleptically bland.

This protein additive was metered into the dry ingredient feeder at a rate continuously providing a proportion of the protein material equal to 1.0% of the weight of flour employed.

The ingredients were continuously blended by the pre-mixer, that device also serving to deliver the preliminary mixture to the heavy duty mixing or developing device operated at such a high speed as to develop a complete, soft, putty-like dough in a few minutes. The dough so developed was extruded continuously through a forming nozzle to produce a continuous length of dough, and the length of dough was continuously cut into successive individual pieces of a size suitable for one-pound loaves of bread. As cut, the dough pieces were dropped into individual baking pans and the pans then conveyed to a proofer, where the dough was proofed at 98° F. for 55 minutes. The loaves were then baked in a continuous oven in the usual fashion.

The baked loaves were compared with loaves produced in the same continuous bread making plant, using the same dough formulation, without inclusion of the special protein material employed in this example. Those loaves prepared without the protein material were found to have an extremely soft and flimsy internal structure, somewhat resembling pound cake, which tore and crumbled when the bread slice was stretched or bent. The loaves prepared with the special protein material were found to have an internal structure comparable to that of bread produced by the conventional batch procedures. Slices of bread from the loaves produced in accordance with the invention could be stretched and bent without tearing or crumbling, having sufficient tenacity to allow the slices to be buttered with ease. Further, the bread prepared in accordance with the invention was found to have superior flavor and greatly improved mastication characteristics, yet showed no shortcomings as to grain, texture and other visual characteristics.

*Example 3*

The procedure of Example 2 was repeated, using the same protein additive, but feeding the same to the pre-mixer, via the dry ingredient feeder, at a continuous rate such as to provide in the dough mix a proportion of protein equal to 0.5% of the flour weight. While the improvement in the bread resulting from such smaller amount of protein was not so marked as in Example 2, the character of the bread was markedly better than that of bread produced without the protein additive, even the smaller proportion of protein providing bread having an internal structure approaching that of normal bread.

*Example 4*

The procedure of Example 2 is repeated, using as the protein additive a conventional "soybean protein concentrate" of commerce characterized by containing about 96% by weight protein (dry basis, N×6.25), only about half of the protein having a molecular weight on the order of or greater than 150,000, only a few percent having a molecular weight as high as 300,000, about half of the protein having a molecular weight of only 20,000–80,000. The protein of this material was extensively denatured and contained a proportion of reactively available –SH well in excess of $7 \times 10^{-6}$ moles/gram. The material is very finely particulate, but not organoleptically bland. The material is added continuously to the pre-mix, in the same manner and the same proportion as in Example 2. No material improvement is observed in the bread so produced.

Examples 2 and 3 illustrate the invention as employed to overcome those disadvantages of the continuous bread making process which result from the tendency of the high speed mixing step to disrupt the gluten structure of the dough. The same results can be obtained, while producing bread having an unusually high proportion of nutritive protein, simply by employing larger amounts of the special protein material, such as that produced in accordance with Example 1.

In this respect, the invention is similar to that disclosed and claimed in copending application Serial No. 787,797 filed concurrently herewith by the present inventor and Kazuo Higashiuchi. In the present continuous method, however, it is possible to use somewhat higher proportions of the protein material, since stickiness of the dough, a factor which increases somewhat in direct proportion to the amount of added protein material, is of relatively less importance than is the case when batch procedures are employed. The following example is illustrative of this phase of the invention.

*Example 5*

The procedure of Example 2 is repeated, except that the dry, particulate, fresh protein product of that example is metered into the pre-mixer at a rate providing a proportion of the protein material equal to 20% of the weight of the flour employed. The finished bread so prepared is found to be similar to that of Example 2, in that there is no evidence of the flimsy internal texture which is characteristic of bread produced by the continuous process without employing the protein material of the present invention. As compared with the bread made in Example 2, that produced in accordance with the present example is somewhat smaller in volume and presents a distinctly denser grain structure. This product is more chewy than that of Example 2, has a superior "wheaty" flavor, and a more attractive, darker, glossier crust. While reduced in volume, the bread produced in accordance with this example is commercially satisfactory as white bread.

When the present invention is employed to produce high protein bread, employing proportions of protein material on the order of 10–20% of the weight of the flour, there is a tendency for the finished product to have a somewhat harsher texture than is desired by some portions of the buying public. This factor can be overcome by the method illustrated in the following example:

*Example 6*

The procedure of Example 5 is repeated, introducing the protein material of Example 1 in the desired proportion between 10% and 20% of the weight of the flour. Concurrently, there is introduced into the pre-mixer a relatively small quantity of a refined, bleached lecithin containing a substantial proportion, not exceeding about ⅓ of the weight of the lecithin, of free fatty acid. Advantageously, the lecithin is metered into the pre-mixer at a rate providing a proportion equal to 0.5% of the weight of the flour. Bread produced in accordance with this example is found to have all the advantageous characteristics of the high protein bread of Example 5, but presents a better grain and texture, the added lecithin serving to make the bread softer than when the special protein material is used alone.

I claim:

1. In the production of bread by the continuous process comprising preliminarily mixing a fermented yeast brew with other conventional dough-forming ingredients, then mechanically working the preliminarily-mixed ingredients at such a high speed as to develop a soft, putty-like dough in a few minutes, continuously extruding such dough as it is formed, cutting the extruded dough into loaf pieces, and baking the same, the improvement which comprises introducing continuously into the ingredient mixture prior to such high speed mechanical working step an organoleptically bland, finely particulate, isolated soybean protein material consisting essentially of protein of the globulin type, 40–50% of the protein having a molecular weight of at least 300,000, a material proportion thereof having a molecular weight of at least 600,000, said soybean protein having a reactively available –SH content of from zero to not more than $7 \times 10^{-6}$ moles/gram, said soybean protein being introduced at a rate providing a proportion thereof equal to 0.5–20% of the weight of flour employed.

2. The process of claim 1 wherein said protein material is of such fineness that substantially all thereof passes a 100-mesh screen.

3. The improved continuous bread making process of claim 1 wherein said protein material is added at a rate providing a proportion thereof equal to 10–20% of the weight of the flour employed.

4. The improved continuous bread making process of claim 3 including the step of continuously incorporating with said dough-forming ingredients prior to said high speed mixing step a relatively small proportion of a refined, bleached lecithin containing a substantial proportion of free fatty acid, said lecithin being introduced at a rate providing a proportion thereof equal to about 0.5% of the weight of the flour employed.

5. The process for continuously making bread comprising preparing a fermented brew comprising water, yeast, yeast food and sugar, delivering such brew, flour and conventional dough-forming ingredients continuously to a pre-mixing zone, continuously delivering to said pre-mixing zone an organoleptically bland, particulate soybean material consisting essentially of soybean protein, said soybean material being delivered at a rate providing a proportion thereof equal to 0.5–20% of the weight of the flour employed, continuously delivering the resulting preliminary mixture to a second mixing zone and subjecting the same to high speed mixing capable of developing the mixture into a soft, putty-like dough in a few minutes, extruding such dough, cutting the extruded dough into loaf-pieces and baking the same, said protein material containing a major proportion of protein having a molecular weight of from about 300,000 to about 600,000 and being further characterized by containing not more than about $7 \times 10^{-6}$ moles/gram of reactively available –SH.

6. The process of claim 5 wherein said protein material is introduced to said pre-mixing zone in admixture with the flour and other dry ingredients employed.

7. In the production of bread continuously by first combining conventional dough-forming ingredients with a fermented yeast brew and then subjecting the resulting preliminary mixture to a mechanical working operation of such high speed as will develop the mixture into a soft, putty-like dough in a few minutes, that improvement which comprises uniformly distributing through the preliminary ingredient mixture an organoleptically bland vegetable protein material comprising a major proportion of protein having a molecular weight of at least about 300,000, the amount of said protein material being equal to 0.5–20% of the weight of flour employed.

References Cited in the file of this patent

UNITED STATES PATENTS

| 1,321,480 | Satow | Nov. 11, 1919 |
| 1,936,718 | Jordan | Nov. 28, 1933 |
| 2,495,706 | De Voss et al. | June 31, 1950 |
| 2,524,991 | Renner | Oct. 10, 1950 |
| 2,615,905 | Forstmann et al. | Oct. 28, 1952 |

FOREIGN PATENTS

| 735,184 | Great Britain | Aug. 17, 1955 |

OTHER REFERENCES

Journal of Agricultural Research, No. 15, 1938, pp. 738 to 741, 744, 745.

The Bakers Digest, December 1942, pp. 283, 284.

Soybean Digest No. 1949, pp. 17, 18.